Dec. 13, 1938.　　G. J. HEPPNER ET AL　　2,140,319
STEERING MECHANISM
Filed Oct. 23, 1937
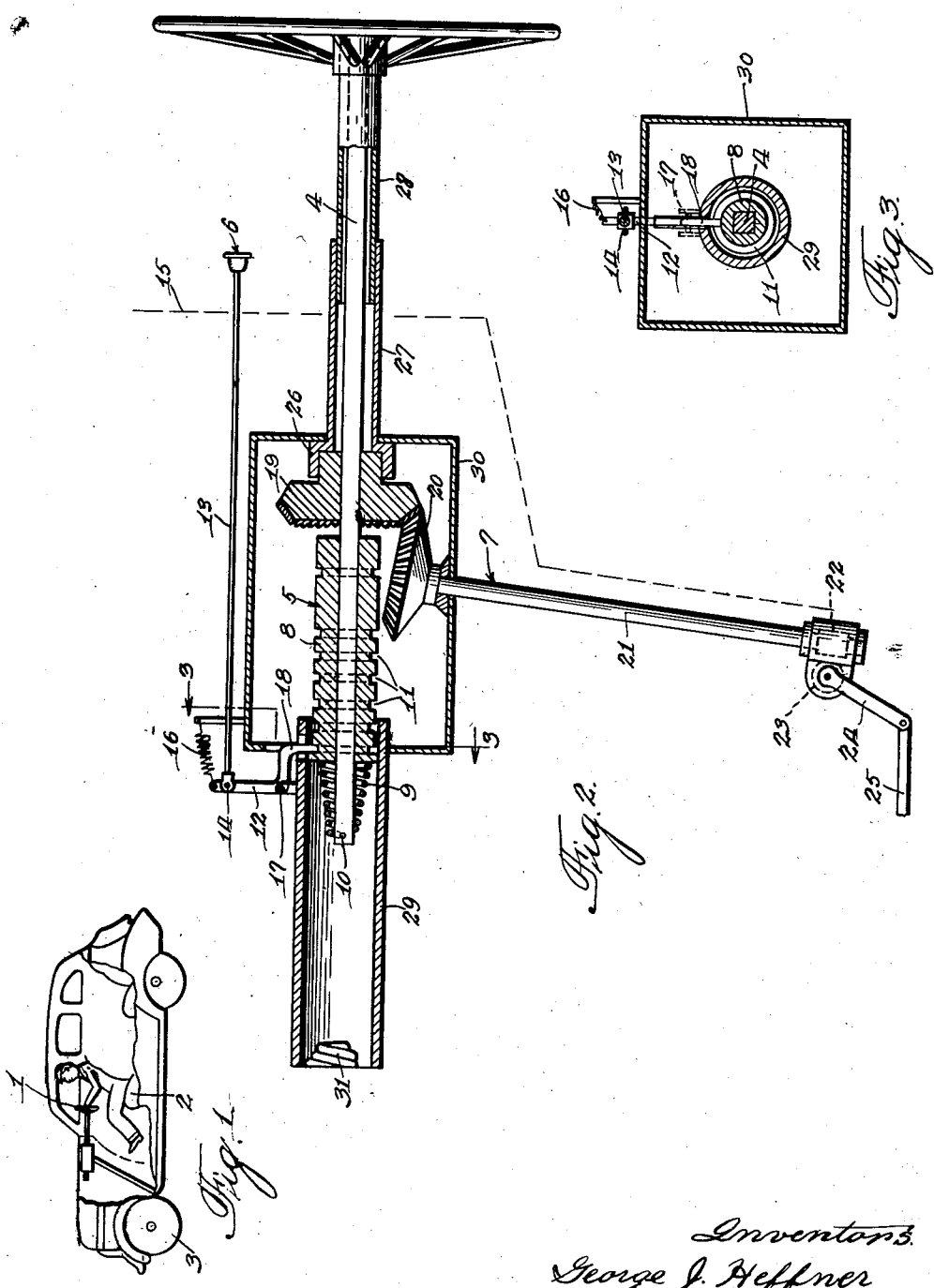
Inventors.
George J. Heffner
E. Ford Chase.

Patented Dec. 13, 1938

2,140,319

UNITED STATES PATENT OFFICE 2,140,319

STEERING MECHANISM

George J. Heppner, San Francisco, and Edwin Ford Chase, Auburn, Calif.

Application October 23, 1937, Serial No. 170,512

2 Claims. (Cl. 74—493)

Our invention relates to steering mechanism.

One of the objects of our invention is to provide a steering mechanism for automobiles provided with yieldable means for cushioning the impact caused by sudden stopping of the automobile, which impact if not cushioned might cause serious injury to the driver, such as a crushed chest or the like, in case of collision with another car or any other cause which would result in a sudden stopping of the automobile.

A further object of our invention is to provide a steering wheel which may be adjusted axially to provide maximum comfort and efficient driving and to make entrance or exit with respect to the vehicle more convenient.

A further object of our invention is to provide an adjustable steering wheel which may be moved to different positions of axial adjustment by the driver while in driving position.

Further objects and advantages of the invention will be apparent from the description and claims.

In the drawing in which an embodiment of our invention is shown,

Figure 1 is a side elevational view of an automobile equipped with our improved steering mechanism;

Fig. 2 is an axial vertical section through the steering mechanism; and

Fig. 3 is a vertical section on the line 3—3 of Fig. 2.

Referring to the drawing in detail, the construction shown comprises an automobile including the steering wheel 1, the driver's seat 2, the guiding wheels 3, a shaft 4 on which the steering wheel 1 is mounted, means 5 for mounting the shaft 4 for rotation and for securing it in a plurality of different positions of axial adjustment, means 6 operable by the driver while in driving position for releasing the shaft 4 from one of said positions of axial adjustment and securing it in another of said positions, and transmission 7 between the shaft and the guiding wheels 3 of the automobile. The shaft 4 on which the steering wheel 1 is mounted extends through a sleeve 8, the shaft 4 being movable longitudinally of the sleeve but held against relative rotation with respect thereto, as by making the shaft noncircular in cross section, as shown in Fig. 3, and fitting in a non-circular opening in the sleeve 8.

In order to cushion the impact on the steering wheel 1 and to enable the steering wheel to yield under impact, a coil tension spring 9 is provided, one end of which is connected at 10 with the shaft 4 and the other end of which is secured to the sleeve 8.

For securing the shaft 4 and sleeve 8 in different positions of axial adjustment, the sleeve is provided with a plurality of annular grooves 11, any one of which may be engaged by pivoted abutment lever 12. For disengaging the abutment lever from one annular groove 11 and engaging it with another of the annular grooves, a push rod 13 is provided, pivotally connected at 14 with the abutment lever 12 and extending to a position in the rear of the dash 15 in a position convenient for operation by the driver. A coil tension spring 16 is provided which normally holds the abutment lever in engaging position with respect to one of the annular grooves 11. The abutment lever 12 is pivotally mounted at 17, the end of the arm 18 being engageable with the grooves 11.

The transmission from the shaft 4 to the guiding wheels 3 comprises a bevel gear 19 having a squared opening in which the squared shaft 4 fits and can slide, a bevel gear 20 meshing with this bevel gear, a shaft 21 on which this bevel gear 20 is mounted, a worm 22 mounted on the lower end of this shaft 21, a worm wheel 23 meshing with this worm, a lever 24 oscillatable with this worm gear, and a link 25 pivotally connected with the rock lever 24. The bevel gear 19 is rotatably mounted in a suitable bearing sleeve 26 having a tubular extension 27 with which a sleeve 28 on the steering wheel 1 has a telescopic engagement.

The grooved sleeve 8 in which the shaft 4 fits is mounted for rotation in a suitable bearing sleeve 29 which may be mounted on the housing 30 which encloses the gears 19 and 20. A suitable bumper spring 31 may be secured at the front end of the sleeve 29, which will be engaged by the end of the shaft 4 when in its forward position.

The construction disclosed provides yieldable means for cushioning impact on the steering wheel and provides easily operable means for adjusting the axial position of the steering wheel to suit the convenience of the driver and to make entrance or exit with respect to the automobile more convenient.

Further modifications will be apparent to those skilled in the art and it is desired, therefore, that the invention be limited only by the prior art and the scope of the appended claims.

Having thus described our invention, what we claim and desire to secure by Letters Patent is:

1. A steering mechanism for automobiles comprising a steering wheel, a shaft on which said wheel is mounted, a sleeve in which said shaft is axially movable, a bearing in which said sleeve is rotatably mounted, spring means acting between said sleeve and shaft for resisting axial movement of the shaft in the sleeve to cushion impact on the steering wheel, and transmission means between said shaft and the guiding wheel of an automobile.

2. A steering mechanism for automobiles comprising a steering wheel, a shaft on which said wheel is mounted, a sleeve in which said shaft is axially movable, means for mounting said sleeve for rotation, means for securing it in a plurality of different positions of axial adjustment, spring means acting between said sleeve and shaft for resisting axial movement of the shaft in the sleeve to cushion impact on the steering wheel, and transmission means between said shaft and the guiding wheel of an automobile.

GEORGE J. HEPPNER.
E. FORD CHASE.